United States Statutory Invention Registration [19]

[11] Reg. Number: H904

Schmidlin

[43] Published: Apr. 2, 1991

[54] SAFE SECURE SURVIVABLE DOOR LOCKING ASSEMBLY FOR AN OVERPACK CONTAINER

[75] Inventor: Albertus E. Schmidlin, Caldwell, N.J.

[73] Assignee: The United States of America as represented by the Secretary of the Army, Washington, D.C.

[21] Appl. No.: 441,782

[22] Filed: Nov. 27, 1989

[51] Int. Cl.[5] ..... A45C 13/10; E05B 63/00

[52] U.S. Cl. ..... 206/3; 206/1.5; 70/1.5; 70/416

[58] Field of Search ..... 206/3, 1.5; 70/1.5, 70/416; 292/51

[56] References Cited

U.S. PATENT DOCUMENTS

| | | | |
|---|---|---|---|
| 596,294 | 12/1897 | Curtis | 70/1.5 |
| 1,350,766 | 8/1920 | Ailes | 70/1.5 |
| 1,634,933 | 7/1927 | Dalton | 292/51 X |
| 2,001,403 | 5/1935 | Williams | 292/51 X |
| 4,476,988 | 10/1984 | Tanner | 206/3 X |
| 4,520,736 | 6/1985 | Crosby et al. | 70/1.5 X |
| 4,679,415 | 7/1987 | Spratt | 70/1.5 X |
| 4,733,596 | 3/1988 | Crow, III et al. | 206/3 X |

FOREIGN PATENT DOCUMENTS

| | | | |
|---|---|---|---|
| 166855 | 5/1954 | Australia | 70/1.5 |
| 675172 | 5/1929 | France | 292/51 |

*Primary Examiner*—Michael J. Carone

*Attorney, Agent, or Firm*—Anthony T. Lane; Edward Goldberg; Michael Sachs

[57] ABSTRACT

There is disclosed an improved locking assembly mounted on a door assembly of a SOC and including a plurality of segmented linear bolts peripherally-disposed about the door assembly for engaging cooperating latches mounted on the container body and operatively connected to handle assemblies for latching and unlatching the locking assembly to permit opening and closing of the door assembly of a SOC and wherein each handle assembly is provided with a key operated combination lock.

14 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 4A
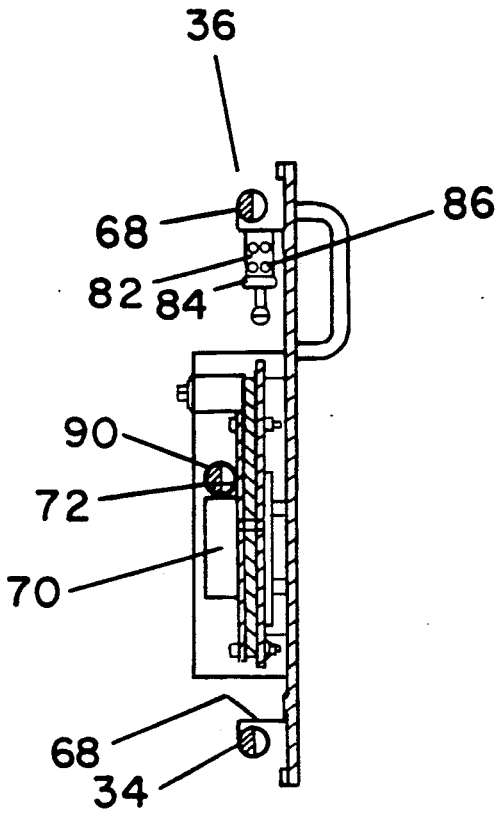
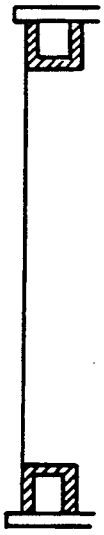
FIG. 4

SAFE SECURE SURVIVABLE DOOR LOCKING ASSEMBLY FOR AN OVERPACK CONTAINER

GOVERNMENT INTEREST

The invention described herein may be made, used, or licensed by or for the Government, for governmental purposes.

BACKGROUND OF THE INVENTION (1) Field of the Invention

This invention relates to a locking assembly, and more particularly to a safe secure survivable door locking assembly for an overpack container for storing projectiles.

(2) Description of the Prior Art

A survivability overpack container (SOC) is a ballistically-hardened container for shipping and storing up to three projectiles during peacetime, transition to war and wartime. A SOC is specifically designed to provide protection against small arms and fragments from indirect fire weapons, chemical attack and nuclear effects. The SOC by its security features has replaced the weapon security container (WSC) of the weapon access delay system (WADS). The SOC provides increased safety as a result of design features which reduce the probability of damage in the event that weapons are exposed to high velocity impact, crush, impalement and/or fuel fire environments associated with fixed and rotary wing aircraft accidents, etc.

OBJECTS OF THE PRESENT INVENTION

An object of the present invention is to provide an improved locking assembly for a survivability overpack container.

Another object of the present invention is to provide an improved locking assembly for a survivability overpack container meeting SOC security requirements. A further object of the present invention is to provide an improved locking assembly for a survivability overpack container having a penetration assembly activating an internal safety lock.

A still further object of the present invention is to provide an improved locking assembly for a survivability overpack container having multilayer steel plates and gearing which will jam the mechanism under tampering situations.

SUMMARY OF THE INVENTION

These and other objects of the present invention are achieved by an improved locking assembly mounted on each door assembly of a SOC and including a plurality of segmented linear bolts peripherally-disposed about the door assembly for engaging cooperating latches mounted on the container body and operatively connected to handle assemblies for latching and unlatching the locking assembly to permit opening and closing of the door assembly of a SOC and wherein each handle assembly is provided with a key operated combination lock.

BRIEF DESCRIPTION OF THE DRAWINGS

Additional objects and advantages of the present invention will become apparent from the following detailed description when taken with the accompanying drawings wherein like numerals indicate like parts throughout, and wherein:

FIG. 4 is a sectional side view of the door assembly taken along the line 4—4 of FIG. 2; and FIG. 4A shows an end view of the structure shown in FIG. 2.

DETAILED DESCRIPTION OF THE INVENTION

Figure 1:
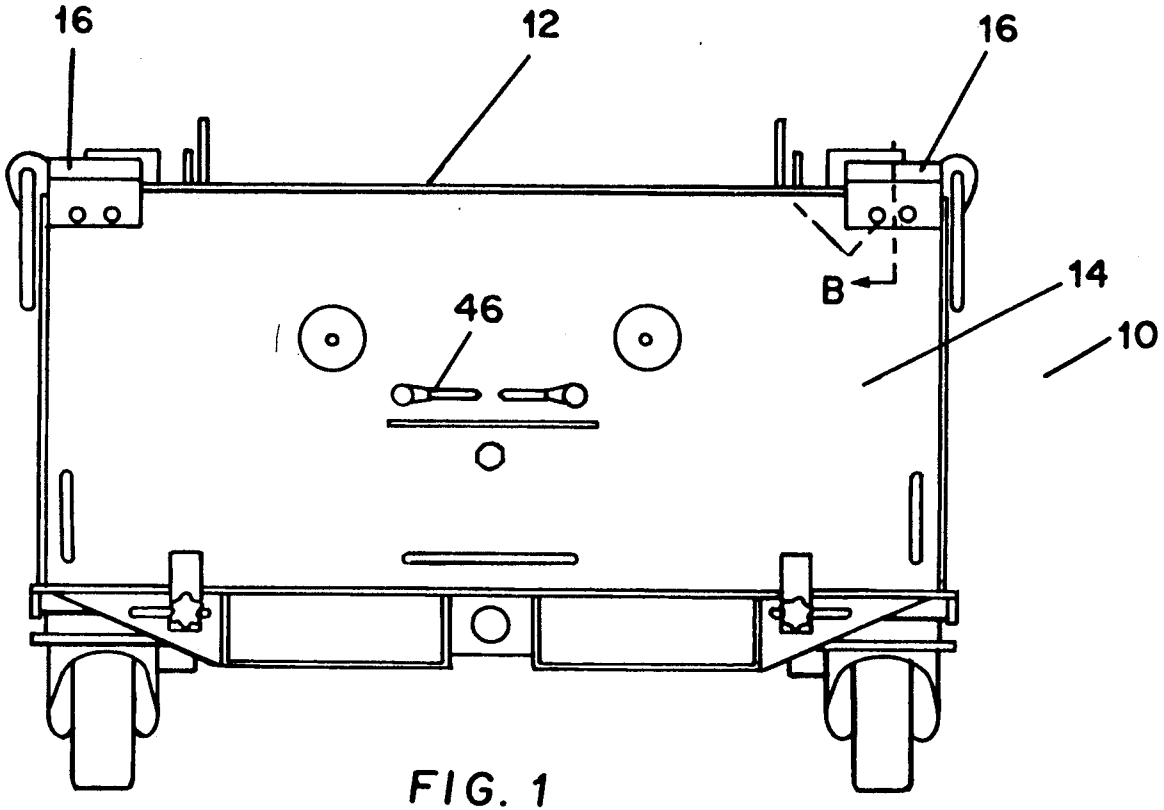
FIG. 1 is a front elevational view of a survivable overpack container including a door locking assembly of the present invention.
Figure 2:
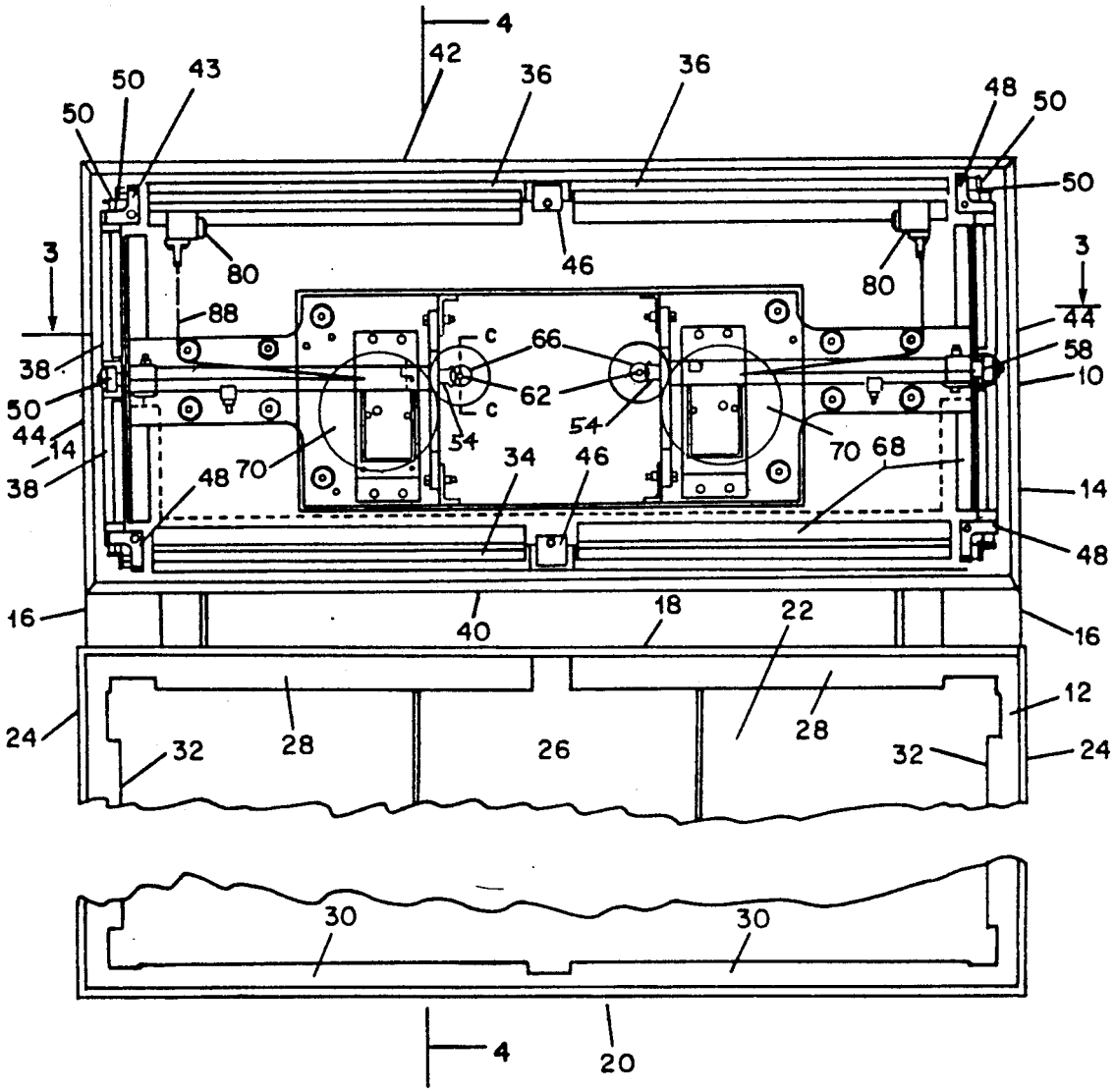
FIG. 2 is a partial front view of the survivable overpack container with the door assembly in an opened position.

Referring now to the drawings, and particularly FIGS. 1 and 2, there is illustrated an overpack container assembly, generally indicated as 10, comprised of a container body 12 and a container door assembly, generally indicated as 14 hingeably mounted by hinge members 16 to the container body 12. The container body is formed of ballistically hardened materials and of a construction known to one skilled in the art to increase safety, security and survivability during puncture, transition-to-war and wartime. The door assembly 14 is likewise formed of such ballistically hardened materials. The overpack container assembly 10 is specifically designed to provide protection against small arms and fragments from indirect fire weapons, chemical attack and nuclear effects. The overpack container assembly 10 with its security features replaces a Weapons Security Container (WSC) of the Weapon Access Delay System (WADS). The overpack container assembly 10 also provides increased safety since it reduces probability of damage in the event that the weapons are exposed to high velocity impact, crush, impalement and/or fuel fire environments associated with fixed and rotary wing aircraft accidents.

The container body 12 is formed by a top wall 18, a bottom wall 20, a rear wall 22, and side portions 24 defining a rectangularly-shaped opening 26. Peripherally-disposed about the opening 26 on an inner surface portion of the top wall 18, bottom wall 20 and side portions 24, there are provided rectangularly-shaped hollow bar members 28, 30, and 32, respectively, affixed to and extending peripherally-inwardly from the respective walls. The bar member 28, 30, and 32 are discontinuously disposed about the periphery in a manner to provide opened areas at mid and corner portions thereof, as more fully hereinafter discussed.

Figure 3:
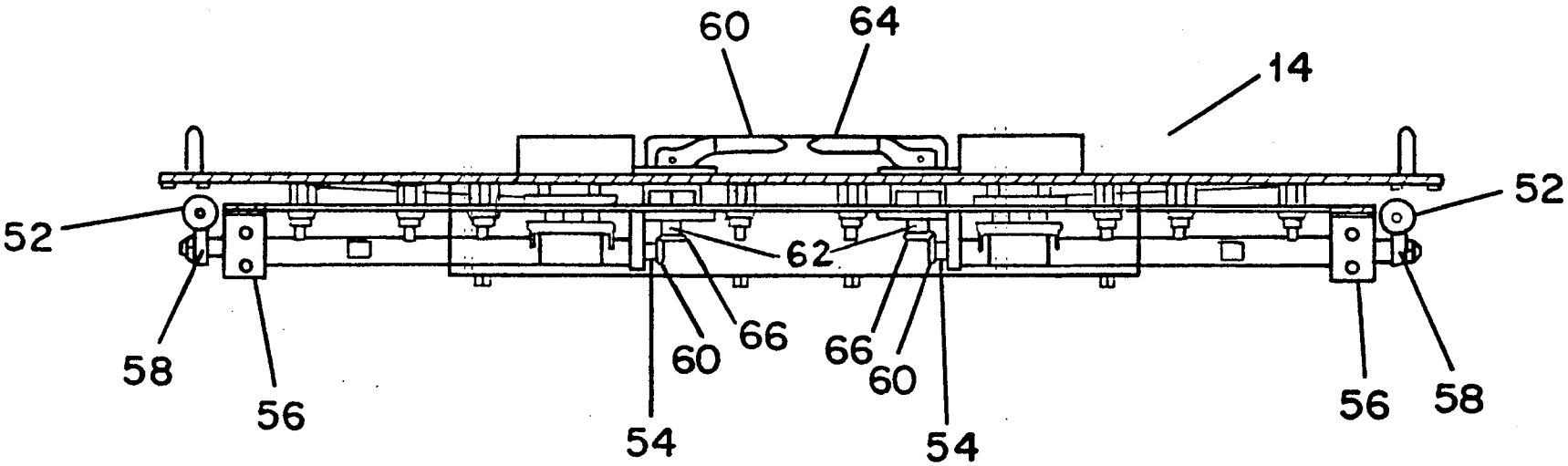
FIG. 3 is a sectional top view of the door assembly taken along the lines 3—3 of FIG. 2.

The door assembly 14, referring particularly to FIGS. 2 and 3 is provided with a locking system comprised of a plurality of peripherally-disposed rod members 34, 36 and 38 including intermediate D-shaped portions disposed proximate a top portion 40, a bottom portion 42 and side wall portions 44 corresponding to the top wall 18, the bottom wall 20 and side portions 24, respectively, of the container body 12.

The rod members 34 and 36 are journalled for rotation in intermediate support member 46 and end support members 48 disposed proximate a juncture point between the top and bottom portions 40 and 42 with the side portions 44, it being understood that the left and right rod half members of 34 and of 36 are not connected at the intermediate support member 46. Terminal end portions of the rod members 34, 36 and 38 are provided with a miter gear 50. Intermediate the rod members 38 is disposed along the side portions 44 of the door assembly 14, there is provided a helical gear member 52.

Extending parallel to and intermediate the top and bottom portions 40 and 42 of the door assembly 14, referring to FIG. 3, there is provided on either side thereof a shaft 54 mounted for rotation in support members 56. An end of each shaft 54 proximate the side portions 44 is provided with a helical gear member 58 in geared relationship with the helical gear member 52 disposed on the side rod member 38. At the other end of the shaft 54 there is provided a miter gear 60. Extending through the door assembly 14, approximately centrally disposed thereto, there are provided a shaft member 62 provided with a handle member 64 on an outer side thereof and a miter gear 66 on an inner portion thereof in geared relationship with the miter gear 60 on the shaft 54, as more fully hereinafter disclosed. The rod members 34, 36 and 38 are covered with protective S-shaped plate members 68.

Each handle assembly including handle member 64 is provided with a key locking assembly, generally indicated as 70. Rotation of the handle member 64, concomitantly rotating of the shaft 62 effects rotation of the shaft 54 via the miter gear 66 - miter gear 60 relationship, as more fully herein after disclosed. A latch member 72 of the key locking assembly in a locked configuration thereof is cause to contact a flat surface of the shaft 54 thereby preventing rotation of the shaft 54 and unlatching of the door assembly 14 from the container body 12.

The locking system is provided with a disabling assembly, comprised of spring-loaded plunger assembly (two illustrated), generally indicated as 80, comprised of a cylinder 82 for a plunger 84 and including a spring 86. The plunger 84 is in a spring-loaded configuration caused by the spring 86 held under compression by a line 88 connected to the plunger 84. Should the container assembly 10 be penetrated under conditions to fracture the armor glass or to gain access to the shaft 54, the lines 88 are caused to distend or part in a manner to permit the plunger 84 to move under the compression of the spring 86 and contact a surface portion of the D-shaped bar member 36 under condition to prevent rotation thereof as more fully hereinafter described.

Figure 5:
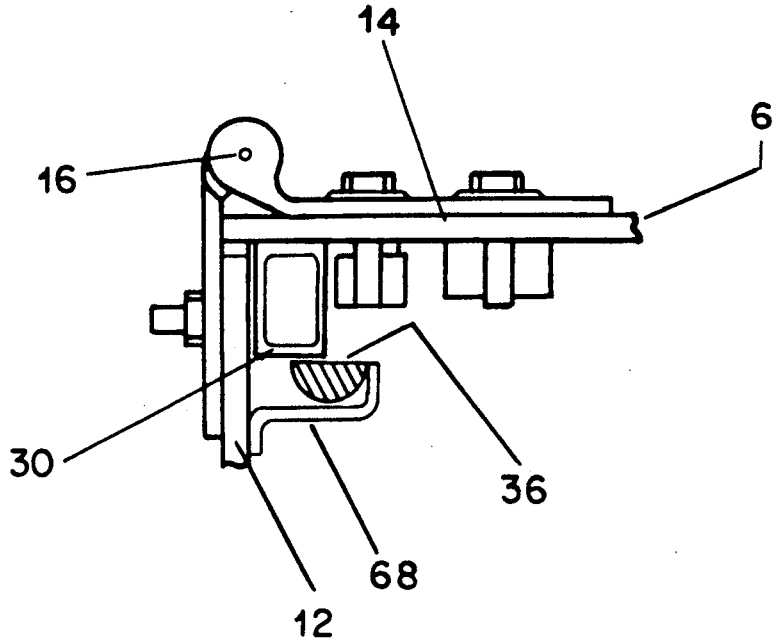
FIG. 5 is a partial sectional side view of the door assembly closed on the container assembly in an unlocked configuration of the locking assembly.

In operation, assuming an opened condition of the door assembly 14 with respect to the container body 12 as illustrated in FIG. 2, the D-shaped bar members 34, 36 and 38 are positioned to permit unimpeded closing of the door assembly into the container body 12, such as illustrated in FIG. 5. Therein the D-shaped bar members 34, 36 and 38 are permitted to assume a position proximate the rectangularly-shaped latching member 28, 30 and 32, respectively. Rotation of the handle member 64 into an appropriate locking configuration effects a one quarter rotation of the D-shaped bar members 34, 36 and 38, referring to FIG. 6, to a latching position whereby the D-shaped bar members 34, 36 and 38 are caused to contact a surface of the latching members 28, 30 and 32, respectively under conditions to permit any further movement between the door assembly 14 with respect to the latching members thereby fixedly positioning the former to the latter. Subsequent positioning of the latch member 72 with respect to the shaft member 54 prevents inadvertent rotation of the handle member 64.

Thus, the door locking system of the present invention is divided into two parts, the left and right sides. Each side is comprised of D-shaped bar members along the top, side and bottom supported in individual bearings. At the corners, miter gears synchronize the bar members so that all flats are simultaneously in either the locked or unlocked position. It should be noted as stated earlier that the D-shaped bar members are limited to the region between the bearings and not at the bearing location themselves.

Figure 6:
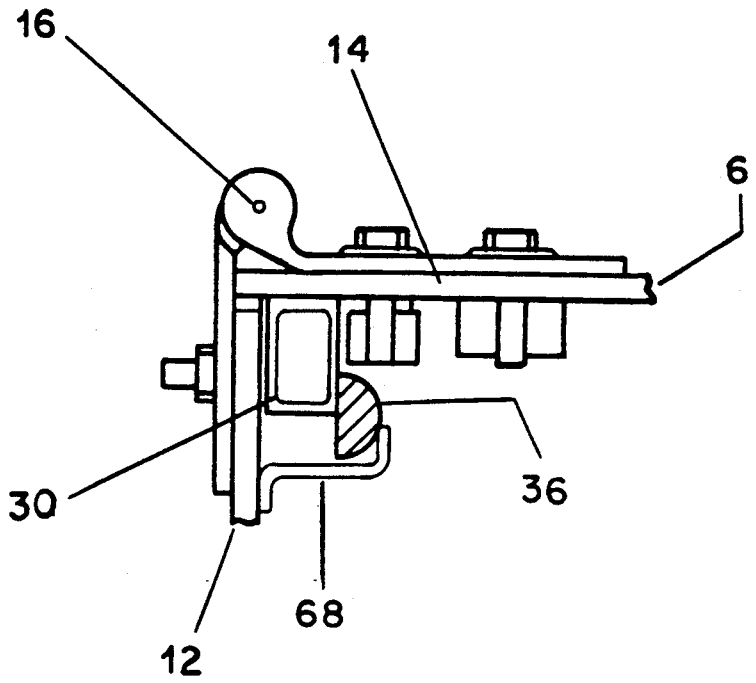
FIG. 6 is a partial section side view of the door assembly closed on the container assembly in an engaged configuration of the locking assembly.

The D-shaped bar members are driven by a drive shaft 62 and handle assembly with the operating handle 64 on the outside of the door assembly 14. Motion of the handle 64 rotates the shaft 54 via the miter gear assembly 66, there-by transmitting its motion from the handle to the horizontal shaft 54. The horizontal shaft 54 is coupled to the vertical D-shaped bar members 38 via helical gears 58. Rotation of the handle causes the vertical D-shaped shaft to rotate back and forth, as illustrated in FIGS. 5 and 6. The horizontal shaft also has a short D-shaped shaft segment for a so-called "last chance lock" and a radial slot which is used to hold the locking system in the unlocked position. The last chance lock is so-called because it keeps the door latched to a SOC even if the peripherally D-shaped bar members have been foiled by an adversary.

The latch 72 travels through a protecting tube 90 said tube also shrouds the shaft 54. Such latch motion acts to lock the horizontal shaft 54 in either of two positions, locked with door locked or locked with door unlocked necessary to comply with operational requirements. In the door locked position, the primary latch engages the short D-shaped segment of shaft 54, preventing its motion toward the opening direction. At the same time, the D-shaped shaft 54 engages the last chance striker which is attached to a fixed vertical member in the center section of the door, remote from the perimeter. In the locked-with-door-unlocked position the primary latch is engaged in the radial slot mentioned earlier. The latter feature is desired in order to render the D-shaped shaft held open or inert during certain operational conditions.

Figure 7:
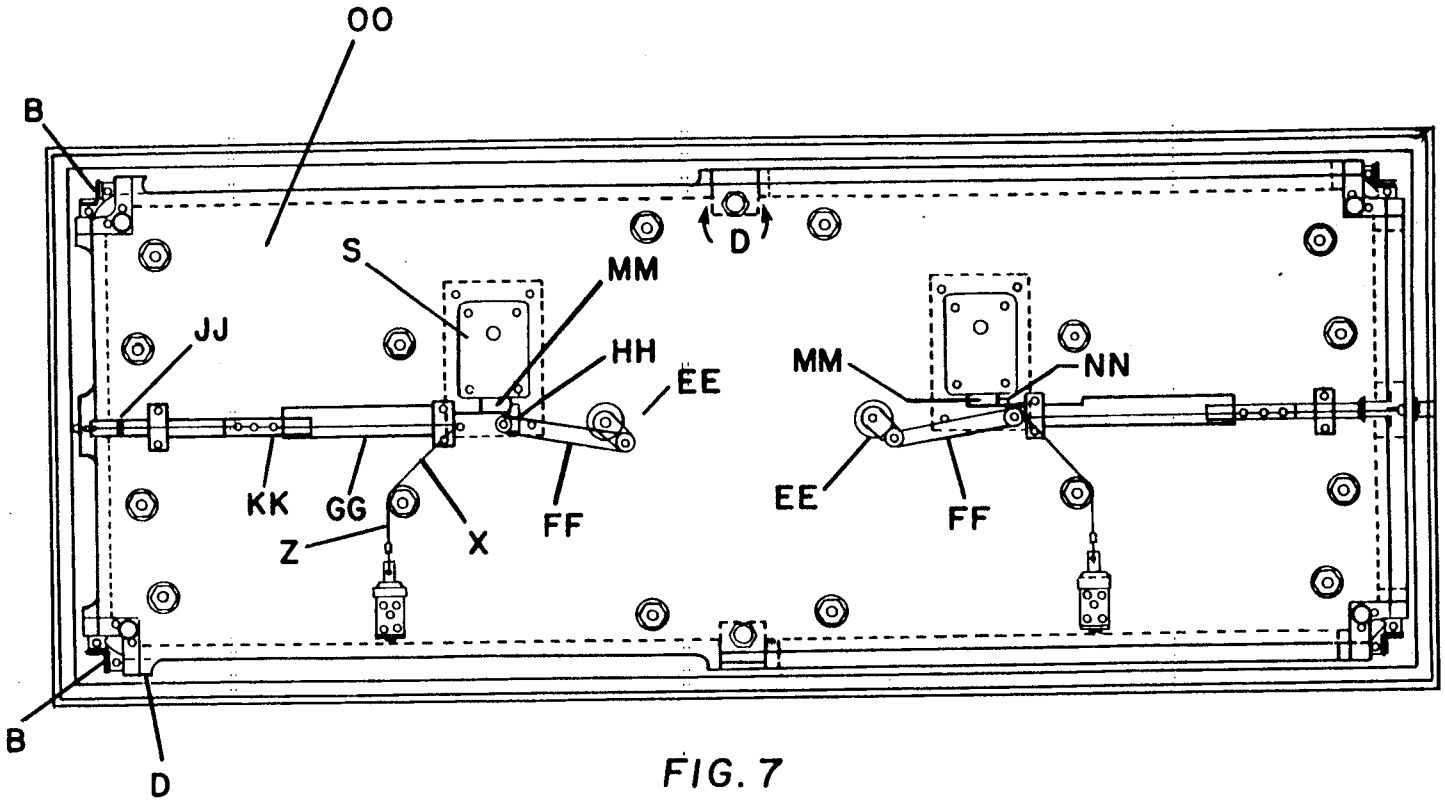
FIG. 7 is an alternative door assembly with different sleeve bearing locations in operation.
Figure 7A:
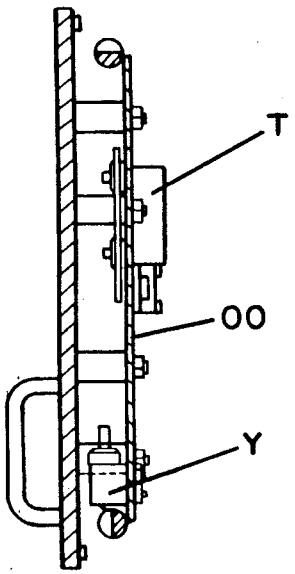
FIG. 7A shows and end view of the structure in FIG. 7.
Figure 8:
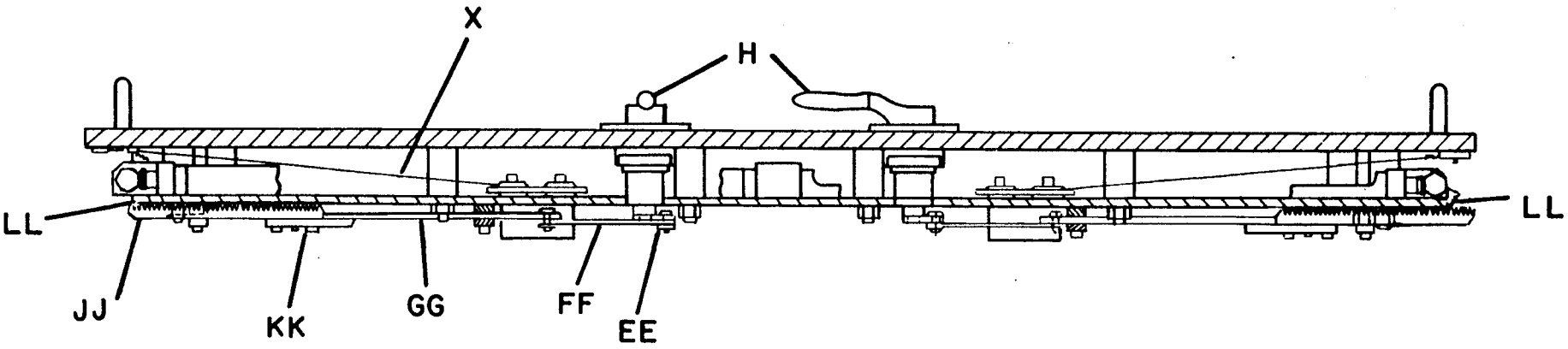
FIG. 8 shows a lengthwise side view of the structure in FIG. 7.

An alternative door locking system is shown on the drawing of FIGS. 7, 7A and 8. As before, the door locking system is divided into two parts, the left and right sides. The drawing shows the left side in the unlocked position and the right side in the locked position. Each side is comprised of three D-shaft segments along the top, side and bottom, respectfully. These segments are supported in individual sleeve bearings which are self aligning and are shown in FIG. 7 at D. At the corners, nit=gears (at B) synchronize the segments so that all flats are in either the locked or unlocked position simultaneously. It should be noted as stated earlier that the D-shaft shape is limited to the region between the bearing and not at the bearing locations themselves. Therefore, the door frame is notched out in order to clear the bearing housings during the door opening and closing.

There is a different location of the sleeve bearings here. Previously the bearing housings were attached to the outer door plate. Here there is an inner plate called the backshield of non-metallic material which covers the full area of the door. This plate also supports the bearing housings, thereby separating the locking mechanisms from the outer door.

The D-shaft segments in this design are driven by a rack and pinion means which is stroked by a crank and handle assembly with the operating handle on the outside of the door as before. Motion of the handle rotates the crank EE thereby transmitting its motion via FF from the handle to the horizontal bar GG. The two ends cf the horizontal bar are shown at HH and JJ. The horizontal bar GG is made in two parts, a rectangular shape at HH and a toothed rack at JJ. These two sections are joined at KK.

The horizontal bar is coupled to the vertical D-shaft segments via rack and pinion gears as shown at LL. Rotation of the handle H in and out of the paper causes the vertical D-shaft to rotate back and forth.

The lock shown at S and T in FIG. 8 is a key operated, combination type lock, having a bolt size of approximately 5/16 inch by 1 inch shown at MM and a bolt travel of approximately ¼ inches. The bolt travels vertically and as shown is in the locked position. This bolt motion acts to lock the horizontal bar GG in either of two positions, locked with door locked or locked with door unlocked. These options are necessary to comply with operational requirements. In the door locked position the primary bolt engages a tab on the bar as shown at NN, preventing its motion toward the opening direction. In the locked with door-unlocked position the primary bolt engages the tab as shown at HH, preventing its motion toward the locked position. The latter feature is desired in order to render the D-shaft held open or inert during certain operational conditions.

Anti-tampering features are provided to thwart any possible attack by an adversary. The entire backshield shown at 00 is made of a non-metallic composite such as Kevlar. This material resists the usual cutting devices used on metals such as torches and explosive charges. The elements of the locking system such as the key operated lock, the horizontal bar, the gears and bearings for the D-shaft, are all mounted on the backshield. This assembly act as an inner door in the event the outer steel plate is penetrated by an adversary.

For further protection the locking system includes a relocker as before which is activated by a trip-wire system. The trip-wire is shown in FIG. 8 at X in the plan view and in the Section A—A view. Any attempt at tampering by penetration of the front door plate in the vicinity of the horizontal bar GG will fracture the wire. This action enables a re-locker latch shown at Y which locks up the D-shaft mechanism. The latch is a simple spring-loaded plunger, held back the wire as shown at Z. As stated above this, wire is routed horizontally across the door in the space between the horizontal bar and the front door plate.

While the invention has been described in connection with an exemplary embodiment thereof, it will be understood that many modifications will be apparent to those of ordinary skill in the art; and that this application is intended therefore to cover any adaptations of variations thereof.

What is claimed is:

1. An overpack container assembly, which comprises:

a container body defining a storage chamber provided with peripherally-disposed latching members; and a door assembly having peripherally-disposed bar means for engaging said peripherally-disposed latching members.

2. The overpack container assembly as defined in claim 1 wherein said latching members are rectangularly-shaped channel members.

3. The overpack container assembly as defined in claim 1 wherein said bar means are D-shaped members mounted for rotation for engaging said latching members.

4. The overpack container assembly as defined in claim 3 wherein said peripherally mounted D-shaped members are interconnected at end portions thereof by miter gears.

5. The overpack container assembly as defined in claim 4 wherein said peripherally-disposed bar members are driven in geared relationship by a shaft member connected to a rotatable handle member.

6. The overpack container assembly as defined in claim 5 wherein said peripherally-disposed bar members are formed into a right and left set each driven by respective handle member.

7. The overpack container assembly as defined in claim 6 and further including a disabling means for preventing rotation of said D-shaped bar members upon tampering of said door assembly.

8. The overpack container assembly as defined in claim 7 wherein the disabling means is a spring-loaded plunger assembly including a plunger and a compressed spring member.

9. The overpack container assembly as defined in claim 2 dependent on wherein said bar means are D-shaped members mounted for rotation for engaging said latching members.

10. The overpack container assembly as defined in claim 9 wherein said peripherally mounted D-shaped members are interconnected at end portions thereof by miter gears.

11. The overpack container assembly as defined in claim 10 wherein said peripherally-disposed bar members are driven in geared relationship by a shaft member connected to rotatable handle member.

12. The overpack container assembly as defined in claim 11 wherein said peripherally-disposed bar members are formed into a right and left set each driven by respective handle member.

13. The overpack container assembly as defined in claim 12 and further including a disabling means for preventing rotation of said D-shaped bar members upon tampering of said door assembly.

14. The overpack container assembly as defined in claim 13 wherein the disabling means is a spring-loaded plunger assembly including a plunger and a compressed spring member.

* * * * *